UnitedStates Patent Office 2,891,001
Patented June 16, 1959

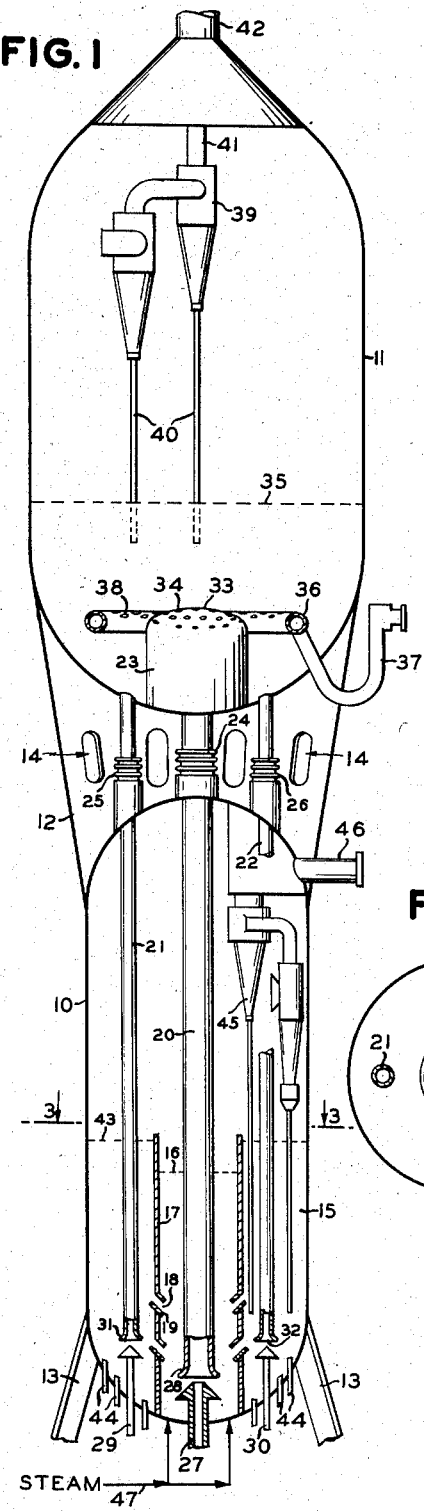
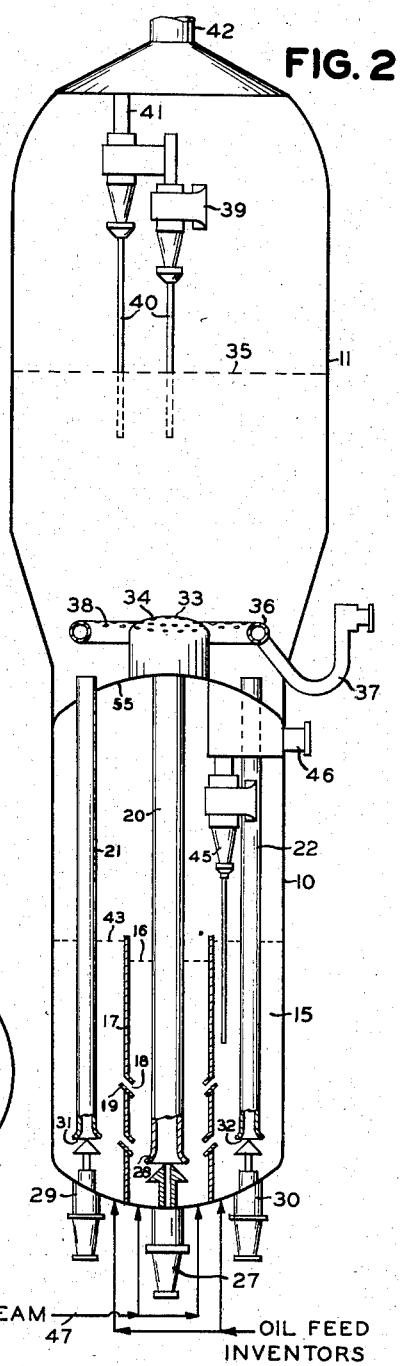

2,891,001

FLUIDIZED HYDROCARBON CONVERSION SYSTEM WITH AN IMPROVED REGENERATOR DISTRIBUTOR

Henry P. Wickham, Glen Head, N.Y., and John B. Osborne, South Orange, N.J., assignors to The M. W. Kellogg Company, Jersey City, N.J., a corporation of Delaware Application October 25, 1954, Serial No. 464,476

12 Claims. (Cl. 208—163)

This invention relates to improved method and means for conducting chemical reactions, and more particularly, it pertains to method and means for catalytically cracking high boiling hydrocarbons to high quality gasoline product.

This application is a continuation-in-part of Serial No. 398,093, filed December 14, 1953, now abandoned.

In fluid systems where the reactor is superimposed on the regenerator, it is necessary to operate the regenerator at a higher pressure than the reactor, and the difference in gaseous pressures of the two process zones is made up by means of a fluistatic head exerted by a column of catalyst extending from the higher reactor to the lower regenerator. As a result of the higher pressure in the regenerator, the cost to construct and operate such a unit is higher than a system where the regenerator is above the reactor by reason that a larger blower for transporting regeneration gas is required, the size of the fractionating columns in the recovery system are larger by virtue that vaporous reaction product is being handled at a lower pressure, and compression costs in handling normally gaseous hydrocarbons in the recovery system are greater. Hence, there is an economic incentive to operate such a system with the regenerator above the reactor notwithstanding the problems which are present in a design involving the placement of a regenerator on a smaller reactor.

In systems where the regenerator is larger in size, and the quantity of catalyst being circulated is high, it is very important to arrange the standpipe and riser within the smaller reactor to provide for free or unimpeded circulation of catalyst particles throughout the bed, and also to arrange for uniform withdrawal of catalyst therefrom. One of the problems involves the size of the riser by which catalyst is circulated from the reactor to the regenerator. From an economic standpoint, it is desirable to use all of the regeneration gas as the carrying medium for spent catalyst passing upwardly through the riser, however, the quantity of regeneration gas may be of such magnitude that the linear velocity in the riser might be sufficient to effect appreciable erosion and the diameter of the riser needed to accommodate such flow would take up considerable space within the reactor. Hence, it can be seen that there are serious problems in designing a system with the regenerator positioned vertically above the reactor, and these problems determine the success or failure of the system for commercial exploitation.

In accordance with the present invention, the method for conducting chemical reactions comprises contacting a gasiform chemical reactant with a dense fluidized bed of finely divided catalytic material in a reaction zone thereby producing a reaction product and contaminating the catalyst with carbonaceous material, withdrawing a portion of contaminated catalyst from the bed in the reaction zone and passing the same upwardly through a first vertical elongated confined zone as a suspension in an oxygen containing gas, the quantity of oxygen containing carrying gas is about 10 to 40% by volume of the total gas which is required for subsequent regeneration, passing the upflowing catalyst from the first confined zone to a regeneration zone which is in vertical alignment above said reaction zone, maintaining a dense fluidized bed of catalyst in said regeneration zone and passing thereto the remaining portion of oxygen containing gas which is required for the combustion treatment of the catalyst, passing regenerated catalyst from the regeneration zone downwardly through a plurality of vertical elongated confined zones to the reaction zone, and said plurality of confined zones are spaced symmetrically with respect to said first confined zone thereby permitting free circulation of catalyst within the reaction zone.

In some systems, the amount of carbonaceous material deposited on the catalyst is small, consequently, a low catalyst circulation rate is used. The present invention is particularly applicable to a system in which at least about 0.25 cubic foot of oxygen containing gas (measured at 60° F. and 760 mm. Hg) is required per pound of catalyst being circulated, or usually about 0.4 to 8 cubic feet per pound of catalyst, and the conditions of reaction warrant the employment of a catalyst to oil ratio, on a weight basis, of at least about 2 and up to about 20. In such systems, the quantity of oxygen containing gas required for regeneration would necessitate the use of a large riser within the reactor, hence, in order that the superficial linear velocity of upflowing material in the riser be maintained below about 50–60 feet per second, and as low as 10 feet per second, which is the safe upper limit insofar as erosion is concerned, and the diameter of the riser be reasonable in relation to the reactor diameter, about 10 to 40% by volume of the total regeneration gas is used as the carrying medium for the spent catalyst; whereas the remainder is charged directly to the regenerator. This is an important aspect of the present invention, because by proper use of the regeneration gas stream, the space available within the reactor for the catalyst bed is of suitable size and shape such that catalyst utilization is not seriously affected by stagnant portions of the bed due to poor circulation of catalyst within the reaction zone. Accordingly, the riser is positioned centrally within the reactor, and it is about 1 to 10%, preferably about 2 to 5% of the reactor diameter size. In a preferred operation, the quantity of oxygen containing gas which is passed upwardly through the riser constitutes about 15 to 25 volume percent of the total regeneration gas, and it provides a preferred linear velocity within the rise of about 20 to 40 feet per second. Hence, the size of the riser or vertical elongated confined zone for upward passage of spent catalyst from the reactor to the regenerator is dependent upon the quantity of carrying gas used, and the size of the riser has an effect on catalyst utilization or efficiency by reason of reaction space made available.

In another aspect of this invention, the spent catalyst is stripped of volatile hydrocarbons by means of a gasiform stripping agent, e.g., steam, hydrogen, normally gaseous hydrocarbon, e.g., methane, ethane, propane, etc., in a stripping zone which surrounds the riser described above. The stripper can be a vertical, cylindrical, hollow means or vessel positioned concentrically with the riser but of larger diameter. The stripper has a cross-sectional area which is about 10 to 50%, preferably about 20 to 30% of the reactor cross-sectional area. The stripper stands about 40 to 80%, preferably about 50 to 75% the height of the reactor and it may be provided with louvers or suitable openings for passage of catalyst from the reactor bed to the stripper at various levels along the height thereof. The use of regeneration gas as carrying gas for the spent catalyst in the riser effects partial combustion of the carbonaceous deposit on the catalyst, consequently, the heat of combustion flows indirectly to the catalyst in the stripper. This can provide for improved stripping by maintaining the stripper at a higher temperature than the reactor bed, for example, about 5° to 20° F. higher.

The type of system contemplated under this invention is particularly applicable to a process in which the regenerator has a diameter of about 1.2 to 2 times greater than the reactor, and both vessels have an L/D ratio (length to diameter) falling in the range of about 0.25 to 3. The regenerated catalyst is returned to the lower positioned reactor by means of a plurality of vertical elongated confined zones or standpipes which are positioned symmetrically in relation to the riser previously discussed. If a single standpipe is employed, there is uneven distribution of catalyst being circulated to the reactor bed, and since the reactor bed is not large relative to the catalyst being circulated, there is a great tendency for short-circuiting of regenerated catalyst directly to the spent catalyst riser. Where the catalyst bed is large relative to the quantity of catalyst being circulated, the freshly introduced catalyst has a better chance of being distributed throughout the bed before passing out again for regeneration. Hence, the present invention is particularly applicable to a system in which about 1 to 30 pounds of catalyst per hour is being circulated per pound of catalyst present in the reaction zone, preferably about 4 to 20, on the same basis. The standpipes can be 2, 3, 4 or more in number depending on the effective cross-sectional area needed for the reaction zone, and these are arranged symmetrically with respect to the riser. Each standpipe has a diameter which provides a catalyst flow rate of 100 to 500 lb./sq. ft./second, and it constitutes about 0.25 to 4% of the reactor diameter. Each of the standpipes is of smaller diameter than the riser.

Two types of systems can be used for this invention, namely, one in which the regenerator is directly superimposed on the reactor and termed, for convenience, as the "single head" system, and the other one involves positioning the regenerator above the reactor such that air can circulate between the vessels and termed, for convenience, as the "two head" system. For reasons of strength in structure, the two vessels are interconnected mechanically by means of an intervessel means or structure which can be, for example, an inverted cone containing suitable openings for passage of air. This is a necessary expedient since the regenerator is the larger vessel, and care should be taken to avoid any tendencies for the vessels to move in position, other than by expansion through changes in temperature. The single head structure is more economical and structurally superior in regard to systems in which the diameter of the regenerator is not more than about 25 feet. Below such diameters, the amount of metal expansion incurred can be reasonably accommodated by using metal thicknesses in vessel structure which can be fabricated and handled without excessive cost and without incurring unreliable vessel quality which may render the vessel unsuitable. At greater diameters than the limited stated above, a two headed system is used preferably.

In connection with regenerators having diameters greater than about 30 feet, the problem of distribution of reactant material becomes important. The use of a grid plate is not desirable because it expands considerably more than the metal of the vessel, since the vessel is insulated interiorly; whereas the grid plate is exposed directly to high temperature materials. Consequently, a grid plate can cause structural failure, hence, it is not useful for large size regenerators, i.e., of larger diameter than mentioned above. For the purpose of distribution, a foraminous means is employed which is about 10% to 30% of the cross-sectional area of the regenerator, and it completely envelops or seals the opening of the riser such that material can only pass through the openings or holes therein. Specifically, the foraminous means can be a cylindrical section with a spherically shaped cover plate containing a plurality of openings. The foraminous means will be designed to create a pressure drop of about 0.15 to 2.5 p.s.i., preferably about 0.25 to 1.5 p.s.i. The air which is charged directly to the regenerator bed is distributed by means of a torus means containing a series of openings for passage of the regeneration gas in a circular fashion around the foraminous means. In this manner, excellent distribution of gas and catalyst is obtained.

The present invention has particular application to a hydrocarbon conversion process in which it is contemplated employing a regenerator which contains more catalyst than the reactor. In this connection, the regenerator catalyst bed is usually about 2 to 5 times as much, on a weight basis, as the reactor catalyst bed. This invention is especially adapted for catalytic cracking of high boiling hydrocarbon oils. The high boiling hydrocarbon oils have an initial boiling point of about 400 to 600° F., and an end point of about 700 to about 1300° F. The API gravity of the high boiling hydrocarbons ranges from about 10 to about 40°. The high boiling hydrocarbons are, for example, gas oils, reduced crude, vacuum distillates, solvent decarbonized residual oils, etc. The high boiling hydrocarbon is cracked at a temperature of about 850 to about 950° F. At this time, the reaction pressure is maintained in the range of about 1 atmosphere to about 50 p.s.i.g., more usually, about 5 to about 25 p.s.i.g. The quantity of oil which is processed relative to the quantity of catalyst which is present in the reaction zone is measured as the weight space velocity and, in general, it is about 0.25 to about 15, more usually about 0.5 to about 5. The catalyst to oil ratio, on a weight basis, falls within the same range specified above, namely, about 2 to about 25, more usually, about 5 to about 10. The catalyst to be used for the cracking step is a suitable cracking catalyst, usually the catalyst is a siliceous material such as one containing silica in the amount of about 50 to about 100% by weight, more usually, about 70 to about 95% by weight. The silica can be used in admixture with another catalytic component, the other catalytic component is, for example, alumina, zirconia, boria, magnesia, etc.

As a result of catalytically cracking the high boiling hydrocarbon oil carbonaceous material is deposited on the catalyst. Hence, the catalyst is subjected to a regeneration treatment at a temperature of 700° to about 1200° F., more usually, about 1000° to about 1150° F. The pressure of regeneration varies in the same range as the reaction pressure. The catalytic material is burned by means of an oxygen containing gas, e.g., air or a diluted air stream. Prior to the regeneration treatment, the catalyst may be subjected to stripping by means of a gasiform stripping agent. The stripping treatment serves to remove occluded volatile materials and to desorb such hydrocarbons contained by the catalyst. The stripping treatment is effected, in general, at a temperature of about 800° to about 1000° F., more usually, about 875° to about 950° F. By virtue that the stripping zone surrounds the riser in which regenerated catalyst is carried upwardly by means of an oxygen containing gas, the heat of combustion generated by burning with the oxygen containing gas is transferred indirectly to the stripping zone such that the temperature of the stripper is about 3 to about 50° greater than the reaction temperature, more usually, about 5 to about 20° greater on the same basis. The gasiform stripping agent which is used for this purpose can be, for example, steam, flue gas, carbon dioxide, normally gaseous hydrocarbons, e.g., methane, ethane, propane, etc.

In order to provide a better understanding of the present invention, reference will be had to the accompanying drawings which form a part of this specification.

In the drawing:

Figure 1 is a specific example of a double head system;

Figure 2 is a specific example of a single head system; and

Figure 3 is a specific illustration of a cross-sectional view along a plane 3—3 in Figure 1 with the omission of the cyclone separator.

A specific embodiment of the invention is shown in the accompanying drawing, in which a reaction vessel 10 supports a regeneration vessel 11 by means of an intervessel structure 12. The entire system is in turn supported by a steel and concrete foundation 13 upon, which reaction vessel 10 rests. The entire reaction vessel and regeneration vessel assembly may weigh 480 tons empty and when they contain the usual process amounts of catalyst, the apparatus and contents may ordinarily weigh about 705 tons or over. Such an assembly may have a height above ground to the top of the regeneration vessel 11 of 135 feet. Both reaction and regeneration vessels must ordinarily be constructed cylindrically with spherical or semispherical upper and lower ends because, in addition to structural strains, they are operating under elevated temperatures and pressures, a temperature of about 1080° F. and about 8 p.s.i.g. being typical for the interior of the regeneration vessel 11 and a temperature of about 900° F. and about 19 p.s.i.g. being typical for the interior of reaction vessel 10. Both vessels are ordinarily lined with about 4 inches of refractory concrete so that under operating conditions the external metal surface exposed to free circulation of atmospheric air will not exceed 200° F. or 300° F., while the metal surface enclosed within the intervessel structure will not exceed the temperature of the air enclosed within that structure by more than 100° F. or 200° F. Because of the huge weights and because of the large dimensional changes with temperature, the two vessels and their intercommunicating apparatus must be massive and yet capable of relative movement. Intervessel structure 12 is preferably shaped like part of an inverted cone. A number of large holes 14 are provided in the structure 12 so that air may freely circulate between the bottom regeneration vessel 11 and the top of reaction vessel 10. Preferably, the space between the ends of the two vessels within intervessel structure 12 is maintained at a temperature not in excess of about 400° F. by the circulation of air.

In the specific embodiment illustrated, the lower part of the reaction vessel 10 is divided into an annular reaction zone 15 and a centrally positioned cylindrical stripping zone 16 by means of a vertical cylinder or well 17 extending from the bottom of reaction vessel 10 up to about its mid-elevation. The horizontal cross-section of the stripping zone should be between about 15% and 40% of the horizontal cross-section of the reaction zone 15. The two zones communicate with each other by means of horizontal slots 18 in the walls of cylinder 17. Slots 18 are disposed at more than one elevation so that the vessel may operate when filled with catalyst to various depths, however, slots 18 are located near the bottom of the zones 15 and 16 so that they are almost always substantially below the upper surface of the catalyst beds contained therein. The slot 18 are shielded by means of louver baffles 19 which extend obliquely downwards (in the direction of flow) from reaction zone 15 to stripping zone 16, and extend along the lower edge of slots 18 to shield them from upflowing vapors and to prevent crossover of gases between the two zones. At maximum level, some catalyst will flow from zone 15 into zone 16 by way of overflow over the upper edge of cylinder 17.

Circulation of catalyst between regeneration vessel 11 and reaction vessel 10 is accomplished by means of a cylindrical upflow conduit 20 and a pair of downflow conduits 21 and 22. Conduits 21 and 22 are arranged symmetrically with respect to conduit 20, and each of said conduits 21 and 22 is spaced equidistantly from well 17 and the vertical side of reactor 10. Conduit 20 opens at its lower end in the lower part of stripping zone 16; at its upper end it enters the bottom of regeneration vessel 11 and opens into the interior of a relatively small distributor vessel 23. The weight of conduit 20 is supported at a bushing in the lower end of regeneration vessel 11. The part of conduit 20 which extends through the cooled space between the two vessels includes an expansion joint 24 of the bellows type.

Conduit 20 is so arranged that it is dependent from the upper end of the reaction vessel 10. A seal between the conduit 20 and the upper end of reaction vessel 10 is provided by the bellows type expansion joint 24, the upper extremity of which is sealed to the external surface of conduit 20 and the lower extremity of which is supported by and is sealed to the upper end of the reaction vessel 10. This seal arrangement permits movement of the conduit 20 in either an upward or a downward direction through the upper end of the reaction vessel 10 and the space enclosed between the ends of the two vessels by the intervessel structure 12.

The movement for which expansion joint 24 is provided occurs when the temperature of the various parts of the apparatus are changed from atmospheric temperature when the apparatus is not in operation to the elevated temperatures resulting from the normal operating conditions for which the apparatus is designed. Typical conditions during operation might be 100° F. to 200° F. for the metal of the intervessel structure 12, 400° F. to 600° F. for the upper end of the reaction vessel 10 and the lower end of the regeneration vessel 11, and 950° F. to 1100° F. for the temperature of the upflow conduit 20.

The total differential movement of the upflow conduit 20 between its support point at the lower end of the regeneration vessel 11 and the valve seat 28 at its lower extremity varies the relatively hot and cold positions of the valve seat 28. The flow of material into the upflow conduit 20 from the stripping zone 16 is dependent upon the size of the opening between the reciprocal valve 27 and its seat 28. This valve is controlled in such a manner that its opening will give the desired flow rate regardless of the movements of its seat due to expansion resulting from change in temperature of the various portions of the apparatus.

Arrangement of the downflow conduits 21 and 22 with their expansion joints 25 and 26, their valves 29 and 30, and their valve seats 31 and 32 is similar to that of the upflow conduit previously described.

Conduits 21 and 22 are similarly suspended from the lower end of regeneration vessel 11 and are also provided with expansion joints 25 and 26. Their intake is from the bottom of regeneration vessel 11 in an annular space external to distributor vessel 23. Their outlets are near the bottom of reaction zone 15, somewhat higher than the inlet of upflow conduit 20, but sufficiently low so as to discharge regenerated catalyst into reaction zone 15 at a point sufficiently low to avoid immediate flow of fresh regenerated catalyst into stripping zone 16 by way of the louvered slots 18.

Upflow through conduit 20 and downflow through conduits 21 and 22 are controlled by plug valves which seat against annular seats on the lower end of the respective conduits, said valves being vertically reciprocable in the bushings in the bottom of reaction vessel 10. Vertically reciprocable valve 27 is centrally positioned and seats against annular valve seat 28 in the lower end of upflow conduit 20, while solid stem valves 29 and 30, similarly reciprocable in the bottom of reaction vessel 10, seat against valve seats 31 and 32 in the lower ends of downflow conduits 21 and 22 respectively. Distribution vessel 23 is a centrally located, vertical cylinder and closed at its lower end by the bottom of reaction vessel 11 and having at its upper end a convex surface 33 which is provided with numerous relatively small openings 34. Distributing vessel 23 serves to discharge spent catalyst entrained in regenerating gases upwardly into a mass of catalyst undergoing regeneration. Such a mass is indicated by the numeral 35. Distributor vessel 23 discharges the spent catalyst and regenerating gas (usually air) into catalyst mass 35 at a point somewhat above the bottom thereof, so that regenerated catalyst being withdrawn from the bottom of catalyst mass 35 is less likely to entrain undesirable amounts of oxygen or other regenerating gas constituents. Additional regenerating gas is introduced into the lower part of catalyst mass 35 by means of a distribution ring. Distribution ring 36 is a hollow toroid which circumscribes distribution means 23 and provides an annular space therebetween. Regenerating gas introduced into the interior of distribution ring 36 by way of pipe 37 escapes into catalyst mass 35 by means of numerous small holes 38 in the upper surfaces of distribution ring 36.

Flue gases rise from the upper surfaces of catalyst mass 35, entraining considerable amounts of the powdered catalyst undergoing regeneration. Most of this entrained catalyst settles out of the rising flue gases as they pass upwardly through the usual 20 feet of settling space above the catalyst mass 35 within regeneration vessel 11. The flue gases then pass through a cyclone separating system 39, returning additional entrained catalyst to catalyst mass 35 by way of diplegs 40. The flue gases then pass out of regeneration vessel 11 by way of line 41 and stack 42, which extends upwardly from regeneration vessel 11 to a distance which is safely above adjacent operating equipment (about 150 feet above the ground, in a typical case).

Regenerated catalyst leaves the bottom of catalyst mass 35 through downflow conduits 21 and 22 and enters a reaction mass of annular shape in the lower part of reaction vessel 10 and indicated there by the number 43. Hydrocarbons to be converted are introduced (usually in liquid form) through a substantial number of jet nozzles 44 in the bottom of reaction vessel 10. There are usually 20 or 30 of these nozzles and they are ordinarily about 1 to 2 inches in internal diameter. The hydrocarbons vaporize almost instantly as they enter the bed of hot catalyst 43 and undergo conversion as they pass upwardly through the mass of catalyst. The converted vapors rise from the upper surface of catalyst mass 43, lose some entrained catalyst by settling in the space above mass 43 within reaction vessel 10, lose further entrained catalyst by passage through a cyclone separating system 45, and then pass out of reaction vessel 10 by way of conduit 46, which carries the reaction product vapors to a fractional distillation tower in which the various conversion products are recycled or separated.

Using the equipment described in Figure 1, the following specific conditions are employed.

| | |
|---|---|
| Regenerator diameter, ft | 32 |
| Regenerator length, ft | 30 |
| Reactor diameter, ft | 20 |
| Reactor length, ft | 35 |
| Conduit 20, diameter, ft | 3 |
| Conduit 21, diameter, ft | 1½ |
| Conduit 22, diameter, ft | 1½ |
| Stripper diameter, ft | 10 |
| Stripper length, ft | 20 |
| Reaction conditions: | |
| Reactor temperature, °F | 900 |
| Reactor pressure, p.s.i.g | 19 |
| Regenerator temperature, °F | 1080 |
| Regenerator pressure, p.s.i.g | 8 |
| Weight space vel., $W_o/hr./W_c$ | 1.5 |
| Catalyst to oil ratio | 12 |
| Vol. percent air charged to conduit 20 | 25 |
| Reactor catalyst, tons | 80 |
| Linear vel. in conduit 20, ft./sec | 40 |
| Oil feed, rate, barrels/day | 11,610 |
| Feed gravity, °API | 25 |
| Stripper temperature, °F | 910 |
| Silica-alumina catalyst. | |

Figure 2 contains a specific illustration of a single head system involving the principles of the present invention. In the drawing, the numerals employed designate similar apparatus parts which were described in connection with Figure 1. The significant difference between Figure 1 and Figure 2 is that in Figure 2, the single partition 55 is a means of dividing the regenerator. This method of fabrication is used where the regenerator is not more than about 25 ft. in diameter. In the specific example given in Figure 2, the regenerator is 19 ft. in diameter and the reactor is 13 ft. in diameter. The $L/D$ ratio for the regenerator is 0.7 and the $L/D$ ratio for the reactor is 1.3. Conduits 21 and 22 are of the same length and diameter and each conduit has a diameter of 1.2 ft. Conduit 20 which serves as a riser for the spent catalyst has a diameter of 1.9 ft. and the air stream which is used as a carrying means for the spent catalyst constitutes about 20% by volume of the total regeneration gas. The linear velocity of the total upflowing material in conduit 20 is 45 ft. per second. Stripping well 17 has a diameter of 6½ ft. and it comprises about 25% of the reactor cross-sectional area.

Figure 3 is a cross-sectional view of the reactor in Figure 1. It is to be noted that conduits 21 and 22 are spaced symmetrically with respect to the central riser or conduit 20. Further, it should be noted that conduits 21 and 22 are spaced equidistantly from the wall of well 17 and the wall of reactor 10. By this arrangement of apparatus parts within the reactor, a free circulation of catalyst within the reaction zone is provided and thereby catalyst efficiency is maintained at a high level and there is little danger of the formation of stagnant portions of catalyst therein.

Having thus provided a written description of our invention along with specific examples, it should be understood that no undue limitations or restrictions are to be imposed by reason thereof, but that the scope of the present invention is defined by the appended claims.

We claim:

1. A unitary vessel comprising in combination a first substantially vertical cylindrical chamber forming the lower portion of said vessel, a second substantially vertical cylindrical chamber of larger diameter than said first chamber coaxially positioned above said first chamber and forming the upper portion of said vessel, a first elongated vertical cylindrical conduit coaxially positioned within the lower portion of said first chamber, said first conduit attached to the bottom of said first chamber and open at its upper end with said first chamber, an elongated substantially vertical open end riser conduit coaxially positioned within said first cylindrical conduit extending from the lower portion thereof upwardly into the lower portion of said second chamber and being capped therein by a foraminous member of smaller diameter than said second chamber, a hollow stem plug valve aligned with the bottom open end of said riser conduit, at least one substantially vertical downflow conduit extending from the bottom of said second chamber downwardly to the lower portion of said first chamber, said downflow conduit terminating in the lower portion of an annular space defined by the walls of said first chamber and the walls of said first cylindrical conduit, a perforated conduit circular in shape horizontally positioned in the lower portion of said second chamber, means for passing a gaseous material to said perforated conduit, means for passing a lift gas to the lower portion of said riser conduit through said hollow stem plug valve, means for passing a gaseous material to the lower portion of said first cylindrical conduit, means for introducing a reactant material to the lower portion of said annular space and means for removing reaction products from the upper portion of said first chamber.

2. The apparatus of claim 1 in which the upflow means has about 1 to about 10 percent of the diameter of the reactor and the downflow means has a diameter of about 0.25 to about 20 percent of the reactor.

3. A vessel comprising in combination a first elongated chamber coaxially positioned above a second elongated chamber of smaller diameter than said first chamber, a cylindrical chamber open at its upper end coaxially positioned within the lower portion of said second chamber and forming an annular space therewith, an elongated open end riser conduit coaxially positioned within said open end cylindrical chamber extending from the lower portion thereof into a semi-spherical perforated chamber confined in the lower portion of said first chamber, an annular perforated conduit horizontally positioned in the lower portion of said first chamber and surrounding said perforated chamber, a plurality of downflow conduit extending from the lower portion of said first chamber beneath said annular perforated conduit to the lower portion of said annular space in said second chamber, a hollow stem plug valve means for passing a gaseous material to the lower portion of said riser conduit, means for adding a gaseous material to the lower portion of said open end cylindrical conduit, means for passing a reactant to the lower portion of said annular space, means for recovering reaction products from the upper portion of said second chamber, means for passing a gaseous material to said annular perforated conduit and means for removing gaseous material from the upper portion of said first chamber.

4. An apparatus comprising in combination a first substantially vertical cylindrical chamber closed at its upper and lower ends by a hemispherical shaped member, a second substantially vertical cylindrical chamber of larger diameter than said first chamber superimposed above said first chamber, a cylindrical conduit open at its upper end extending upwardly from the bottom of said first chamber and forming an annular space therewith, a third cylindrical chamber of smaller diameter coaxially positioned in the lower portion of said second chamber, said third cylindrical chamber being perforated in the upper portion thereof by a plurality of small openings, a riser conduit extending from within the lower portion of said cylindrical conduit upwardly into said third chamber, an annular perforated conduit horizontally positioned in the lower portion of said second chamber circumscribing said third chamber, at least one downflow conduit extending from beneath said annular conduit in said second chamber downwardly into the lower portion of said annular space, means for introducing gaseous material to said riser conduit, means for passing a gaseous material to said annular conduit, means for passing a reactant material to the lower portion of said annular space and means for removing a gaseous material from said first and said second chambers.

5. The apparatus of claim 4 in which the upper hemispherical member of said first chamber forms the bottom member of said second chamber.

6. The apparatus of claim 4 in which the bottom of said second chamber is formed by a hemispherical member and said second chamber is spaced above and connected to said first chamber by an inverted conical frustrum.

7. The apparatus of claim 6 in which the riser conduit and the downflow conduit connecting said first chamber with said second chamber contain bellows type expansion joints.

8. A process for effecting chemical reactions which comprises contacting a gasiform chemical reactant with a dense fluidized bed of catalytic material in a reaction zone to produce a reaction product thereby contaminating the catalyst, withdrawing products of reaction from the upper portion of said reaction zone, withdrawing contaminated catalyst from said reaction zone, passing said withdrawn contaminated catalyst downwardly through a stripping zone countercurrent to stripping gas introduced to the lower portion thereof, withdrawing stripped catalyst from the lower portion of said stripping zone and passing the same as a dilute suspension with gaseous material upwardly as a confined stream into a catalyst distributing zone which extends into the lower portion of a regeneration zone positioned above said reaction zone, said distributing zone being of smaller diameter than said regeneration zone and containing openings in the upper portion thereof for passing contaminated catalyst from said distributing zone into a dense fluidized bed of catalyst in said regeneration zone, contacting said contaminated catalyst in said regeneration zone with additional gaseous material introduced to the lower portion of said dense fluidized catalyst bed exterior to said catalytic distributing zone whereby contaminants are removed from said catalyst by burning, withdrawing regenerated catalyst from said dense fluidized bed below the point of introduction of said contaminated catalyst into the dense fluidized bed of catalyst in said regeneration zone, and passing said withdrawn regenerated catalyst downwardly through at least one confined zone to the lower portion of said dense fluidized bed in said reaction zone.

9. In a conversion process wherein a gasiform reactant is passed in contact with a dense fluidized bed of finely divided catalyst in the reaction zone thereby producing a reaction product and contaminating the catalyst and the contaminated catalyst is passed to a regeneration zone containing a dense fluidized bed of catalyst for contact with a regeneration gas to remove contaminants and the regenerated catalyst is returned to the reaction zone, the improved method for handling said finely divided catalytic material which comprises, withdrawing finely divided catalytic material from said dense fluidized bed of catalyst in said reaction zone, stripping said withdrawn contaminated catalyst in a stripping zone confined within said reaction zone, passing stripped catalyst from the lower portion of said stripping zone as a dilute suspension in a portion of the regeneration gas directly upwardly as a confined stream to a catalyst distribution zone of smaller diameter than said regeneration zone which extends into the bottom of the dense fluidized bed of catalyst in said regeneration zone, introducing additional regeneration gas to the lower portion of said dense fluidized bed of catalyst in said regeneration zone exterior to said catalytic distribution zone in an amount sufficient to substantially completely regenerate said contaminated catalyst, withdrawing regenerated catalyst from the lower portion of said dense fluidized bed of catalyst in said regeneration zone and below the point of introduction of said additional regeneration gas and passing the withdrawn regenerated catalyst through a plurality of confined streams directly to the lower portion of said dense fluidized bed of catalyst in said reaction zone.

10. A process for effecting chemical reactions which comprises contacting a gasiform chemical reactant with a dense fluidized bed of finely divided catalytic material in a reaction zone thereby producing a reaction product and contaminating the catalyst with carbonaceous material, withdrawing reaction products from the upper portion of said reaction zone, withdrawing a portion of contaminated catalyst from the dense fluidized bed in the reaction zone and passing the same upwardly through a first elongated confined zone as a dilute suspension in an oxygen containing gas, the quantity of oxygen containing carrying gas being about 10 to 40 percent by volume of the total gas which is required for subsequent regeneration, passing the upflowing catalyst from the first confined zone to a catalyst distributing zone in the lower portion of a dense fluidized bed of catalyst in a regeneration zone positioned above said reaction zone, said catalyst distributing zone occupying from about 10 percent to about 30 percent of the cross-sectional area of said regeneration zone, passing the remaining portion of oxygen containing gas which is required for the regeneration treatment of the catalyst by combustion into the lower portion of said dense fluidized bed of catalyst in said regeneration zone and passing regenerated catalyst from the lower portion of the regeneration zone downwardly through an elongated confined zone to the lower portion of said reaction zone.

11. A method for handling finely divided catalytic material which comprises passing a chemical reactant in contact with a dense fluidized bed of finely divided catalytic material in a reaction zone thereby converting said chemical reactant to desired products and contaminating the catalytic material, withdrawing reaction products from the upper portion of said reaction zone, withdrawing contaminated catalyst from said dense fluidized bed in said reaction zone and passing the same downwardly through a stripping zone countercurrent to stripping gas introduced to the lower portion thereof, passing stripped catalytic material admixed with a portion of the regeneration gas required to substantially completely regenerate said contaminated catalytic material from the lower portion of said stripping zone upwardly as a confined stream to a catalytic material distribution zone positioned within the lower portion of a dense fluidized bed of catalytic material in a regeneration zone, said distribution zone occupying not more than about 30 percent of the cross-sectional area of said regeneration zone, passing catalytic material from said distribution zone into said dense fluidized bed in said regeneration zone, separately introducing additional regeneration gas from said catalytic material into said dense fluidized bed in said regeneration zone to substantially complete the regeneration of contaminated catalytic material therein, removing gaseous products from the upper portion of said regeneration zone, and withdrawing regenerated catalytic material from said dense fluidized bed below the point of introduction of contaminated catalytic material thereto for return to said reaction zone.

12. A catalytic cracking process which comprises passing a hydrocarbon reactant in contact with a dense fluid bed of cracking catalyst in a cracking zone under cracking conditions to produce a desired product thereby contaminating the catalyst, withdrawing products of said cracking reaction from the upper portion of said cracking zone, withdrawing contaminated catalyst from said dense fluidized bed and stripping said withdrawn contaminated catalyst in a stripping zone confined within said reaction zone, admixing stripped contaminated catalyst with a portion of the regeneration gases and partially regenerating said contaminated catalyst as an upwardly flowing dilute phase suspension, passing said suspension into a catalyst distribution zone positioned in the lower portion of a dense fluidized bed of catalyst in a regeneration zone, said catalyst distribution zone occupying not more than about 30 percent of the cross-sectional area of said regeneration zone, passing said catalyst suspension from said distribution zone into said dense fluidized catalyst bed in said regeneration zone at a pressure drop of from about 0.15 to about 2.5 p.s.i., separately introducing the remaining portion of said regeneration gas to said dense fluidized catalyst bed to substantially completely regenerate catalyst therein and withdrawing regenerated catalyst from substantially the bottom of said regeneration zone for return to the lower portion of said reaction zone.

References Cited in the file of this patent

UNITED STATES PATENTS

| Number | Name | Date |
| --- | --- | --- |
| 2,428,873 | Gunness et al. | Oct. 14, 1947 |
| 2,433,726 | Angell | Dec. 30, 1947 |
| 2,439,582 | Scheineman | Apr. 13, 1948 |
| 2,443,190 | Krebs | June 15, 1948 |
| 2,457,232 | Hengstebeck | Dec. 28, 1948 |
| 2,631,124 | Ogorzally | Mar. 10, 1953 |
| 2,692,848 | Leffer | Oct. 26, 1954 |
| 2,698,281 | Leffer | Dec. 28, 1954 |
| 2,733,193 | Haensel | Jan. 31, 1956 |
| 2,735,803 | Leffer | Feb. 21, 1956 |